United States Patent [19]
DeCock

[11] 3,761,723
[45] Sept. 25, 1973

[54] APPARATUS FOR MEASURING DIMENSIONAL DEVIATIONS

[75] Inventor: Etienne Marie DeCock, Hamme, Belgium

[73] Assignee: Agfa-Gevaert N.V., Mortsel, Belgium

[22] Filed: June 28, 1971

[21] Appl. No.: 157,417

[30] Foreign Application Priority Data
June 29, 1970 Great Britain.................. 31,345/70

[52] U.S. Cl.................:250/560, 250/227, 356/159
[51] Int. Cl. ............................................ G01b 7/04
[58] Field of Search............. 250/219 LG, 219 WD, 250/219 FR, 227; 356/159

[56] References Cited
UNITED STATES PATENTS

| | | | |
|---|---|---|---|
| 3,365,699 | 1/1968 | Foster ..................... | 250/219 WD X |
| 3,311,749 | 3/1967 | Briggs...................... | 250/219 LG X |
| 3,403,263 | 9/1968 | Hargens.......................... | 250/227 X |
| 2,818,467 | 12/1957 | Harris et al............... | 250/219 FR X |
| 3,365,568 | 1/1968 | Germen................... | 250/219 LG X |
| 2,931,917 | 4/1960 | Beelitz..................... | 250/219 WD X |
| 3,248,845 | 5/1966 | Schneider................ | 250/219 WD X |

*Primary Examiner*—Walter Stolwein
*Attorney*—William J. Daniel

[57] ABSTRACT

Method and apparatus for testing dimension deviations of a travelling web. A light source is provided on one side of the web and rows of fibre optics are provided on the opposite side of the web. The fibre optics terminate in photo-detectors which produce an electric signal if the radiation path from the light source to the corresponding fibres is not intercepted by the web. The photo-detectors may be arranged in a matrix so that according to lines running parallel to the diagonal of the matrix indications may be received about the rate of deviations from standard dimensions.

The method and apparatus are particularly intended for measuring edge perforations in cine film.

5 Claims, 7 Drawing Figures

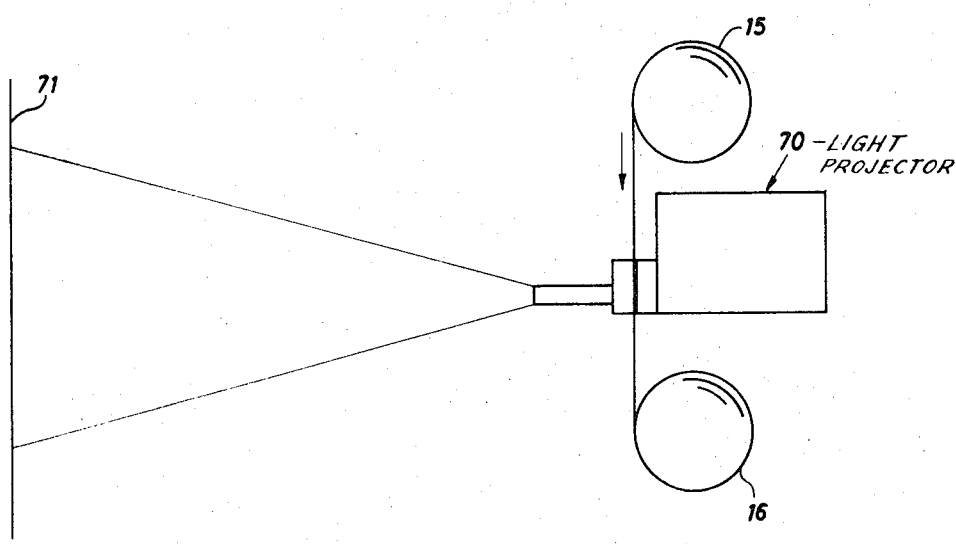
Fig. 7
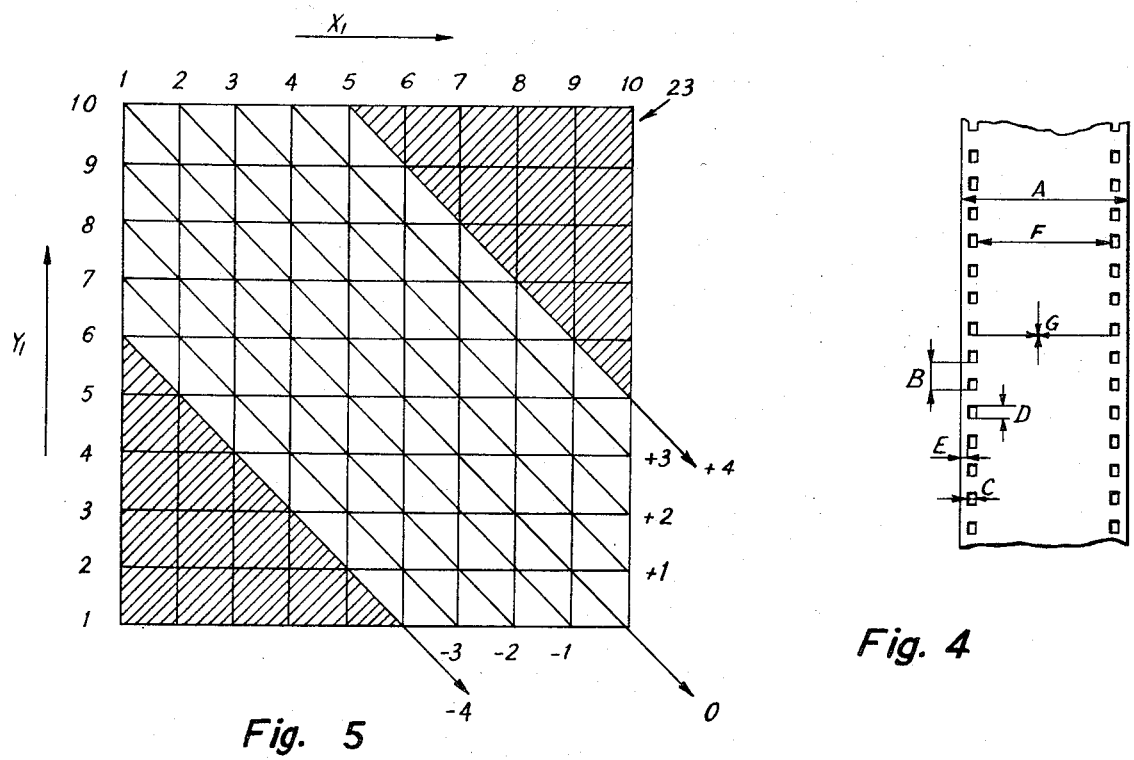
Fig. 5
Fig. 4

APPARATUS FOR MEASURING DIMENSIONAL DEVIATIONS

This invention relates to a method of testing a travelling web in order to determine the location therein of a boundary between areas with substantially different radiation transmitting or reflecting power, or in order to determine variations of a dimension of the web or of perforations therein. The invention also relates to apparatus for use in such web testing methods.

The invention is of special importance for testing perforated webs, e.g., perforated photographic film, for detecting perforation faults, whether faults in the location of the perforations or any of them, or faults in perforation dimensions.

The perforations of e.g. 35 mm motion-picture film are subject to relatively narrow tolerances (see e.g., ASA PH 22.34–1964), in order to guarantee the image stability during the play back.

Formerly it was impossible to detect deviations smaller than e.g., 10 microns in the dimensions of perforations in a continuously moving web.

According to the present invention, a method is provided of testing a travelling web to determine the location therein of a boundary between areas with substantially different radiation transmitting or reflecting power, wherein a source of radiation is employed to direct radiation onto the web path at a position such that the radiation falls across the path followed by said boundary, and wherein the ratio between the quantities of radiation falling on opposite sides of such boundary is detected by means of a line of detectors receiving separate quanta of such radiation passing through or reflected by the web, and such ratio is used as an indication of the location of such boundary.

This method can be employed for detecting the location of boundaries of perforations in a travelling web, in relation to a side edge or to side edges of the web.

Preferably radiation is employed which is absorbed by the web and the detection system is arranged so that the detectors receive radiation which passes through the perforations.

The radiation passing through the perforations may be conducted to the detectors by optical fibres. Thus each detector may receive a quantum of radiation conducted by one optical fibre. As an alternative, the radiation passing through the perforations may be projected by an enlarging optical system onto a surface so that in effect enlarged images of the perforations are formed on that surface. In that case the detectors may be arranged on or immediately beneath said surface. By reason of the enlargement, the change in location (if any) from one perforation to the next along the film is exagerated at the image plane and there is adequate space to accommodate one or more lines of detectors so that the number of detectors of a given line which receive radiation at any given time depends on the boundary location to be determined.

The defined testing method can be employed not only for detecting the location of perforation boundaries in relation to a side edge or to side edges of a web, but also for detecting the location of boundaries between web areas which by virtue of the composition of the web or of material applied thereto absorb or reflect the employed radiation to different extents. To take two examples, the method may be employed for detecting boundaries of areas of colour applied to the web, using light of a spectral composition which is reflected or absorbed only by those areas, or for detecting the location of boundaries of tracks or other markings on a film or other web.

The principle of the above defined testing method can also be employed for determining variations of a dimension of a web or of dimensions of perforations therein, whether in the transverse or longitudinal direction of the web. In this case it is necessary to direct radiation towards the web so that the radiation falls across opposite boundaries of the web or of individual perforations during travel of the web. The proportion of the total radiation which is intercepted by the web is indicative of the film width or of a perforation dimension as the case may be and this proportion is detected by a line of detectors. In such an embodiment the detectors are again preferably placed to receive radiation which passes (as distinct from being reflected from) the web, i.e., either passes the side edges of the web or passes through the perforations. Optical fibres or a projection system as above referred to may also in this use of the testing principle, be employed for directing radiation to the detectors.

As applied to the determination of the web width or of the width dimension of web perforations, the method affords the advantage that the measurement is not affected by small transverse movements of the web during its longitudinal travel.

The detection system may be arranged to determine the number of detectors in a given line receiving a quantity of radiant energy greater or smaller than a certain threshold value or each detector may be associated with an amplification system which has a continuous output, i.e., an output which is not dependent on irradiation of the given detector and which yields a signal only when the output increases due to irradiation of the detector, by more than a certain threshold value. In this way noise effects can be eliminated.

The invention will be more readily understood from a reading of the following specification and by reference to the accompanying drawings forming a part thereof, wherein an example of the invention is shown and wherein:

FIG. 4 shows some dimensions to be monitored.

FIG. 5 shows a matrix to read out the measurement results.

FIG. 7 shows an other embodiment of the invention.

The invention will be described hereunder by means of an apparatus for monitoring the edge perforations in light-sensitive photographic film material, but it is obvious that the invention is not limited hereto. Alternatively, the invention can be used to measure e.g., the width of a moving web or the position of marks in relation to the edge of the web.

Figure 1:
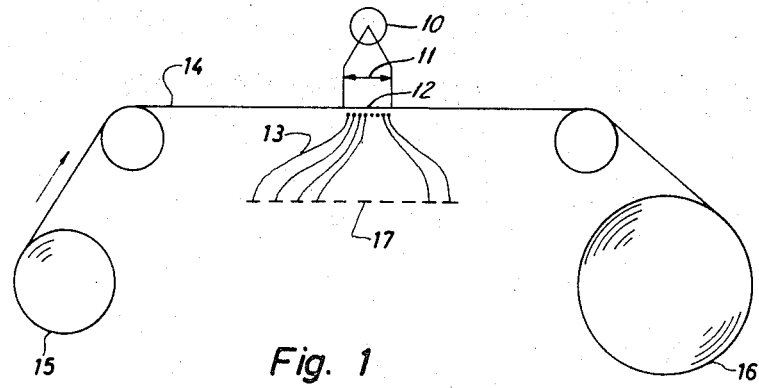
FIG. 1 shows schematically an embodiment of the invention.

In FIG. 1 the lamp 10 directs e.g., infrared radiation to a lens 11 that directs a substantially parallel beam to a moving photographic film 14. The film 14 is delivered from a take-off spool 15 and guided over a pair of guide rollers past the lamp 10 to a take-up spool 16.

The radiation beam forms on the film 14 an illuminated spot 12. At the other side of the film 14, opposite to the lamp 10, are arranged the one extremities of optical fibres arranged in groups, each group being arranged on a straight line. The other extremities of the optical fibres are arranged opposite to photodetectors 17.

Figure 2:
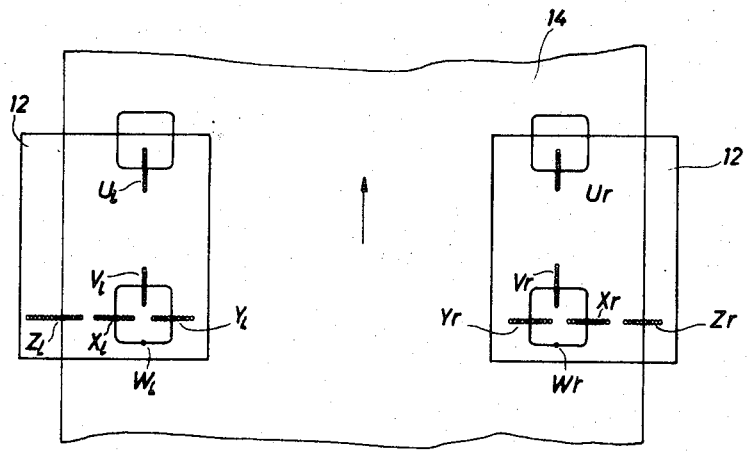
FIG. 2 shows schematically an elevation view of a photographic film whereunder the extremities of the optical fibres are arranged.

In FIG. 2 is shown an elevation view of the film 14 and it may be seen that actually two spots 12 are formed on the film by two optical projection systems (not shown). In the left spot 12 the one extremities of the fibres 13 are arranged in two mutually perpendicular rows $Z_l$, $X_l$, $Y_l$ and $U_l$, $V_l$, $W_l$ under the film 14, whereas at the right side of the film the corresponding spot 12 covers the one extremities of fibres arranged in rows $Y_r$, $X_r$ and $Z_r$, and $U_r$, $V_r$ and $W_r$.

In FIG. 4 the various cutting and perforating dimensions for a 35 mm motion picture film are shown. On each of these dimensions a deviation can be tolerated, e.g., of $\pm$ 40 $\mu$m, such that the image stability of the film is still sufficient. In FIG. 2 the position of the groups $X_1$ and $Y_1$ is such that the dimension C of the left hand perforations can be measured by determining the number of fibres not screened by the film 14 from the light source 10. In an embodiment of the invention the optical fibres 13 have a diameter of e.g., 9 $\mu$m and are separated from each other by e.g., 1 $\mu$m so that the measuring pitch is 10 $\mu$m.

Figure 3:
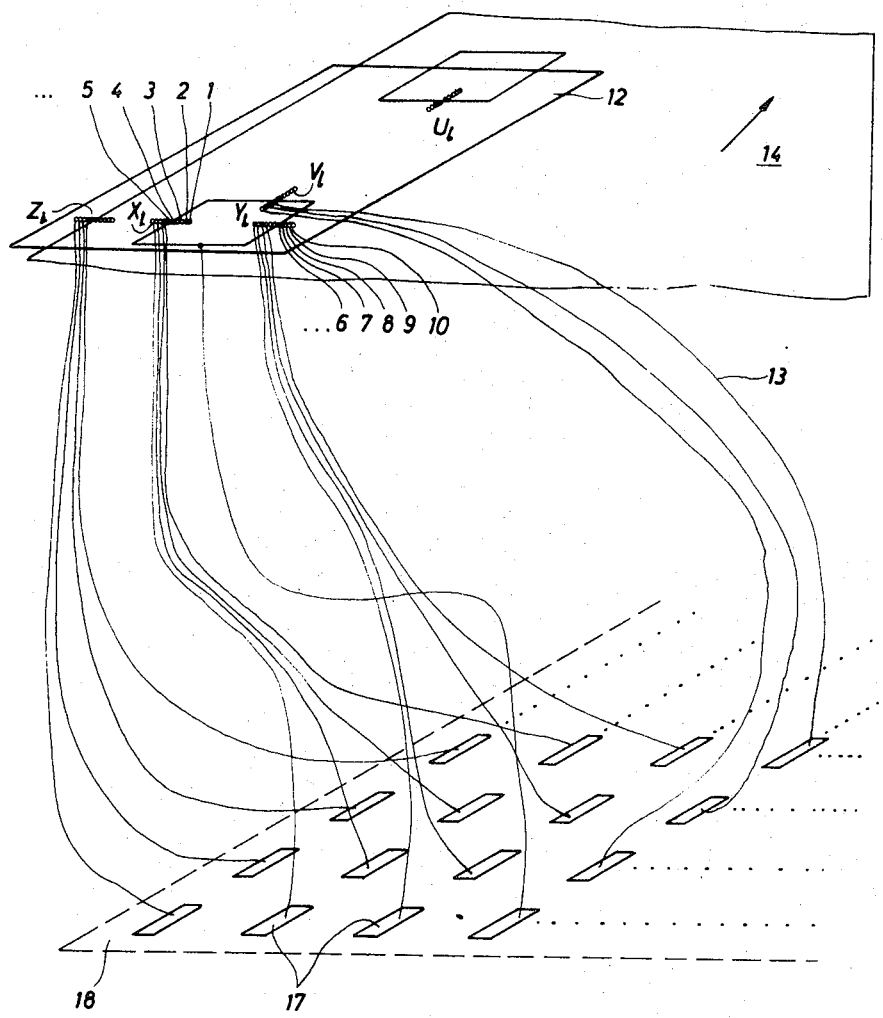
FIG. 3 is a perspective view of the arrangement of the optical fibres.

In FIG. 3 is shown a perspective view, wherein the spatial position of the optical fibres 13 is shown. The photoelectric detectors 17 are arranged in a plane 18. The space between the film 14 and the plane 18 can be filled up with e.g., a non-infrared-transparent resin, so that no infrared radiation of the spot 12 can reach directly the detector 17.

Figure 6:
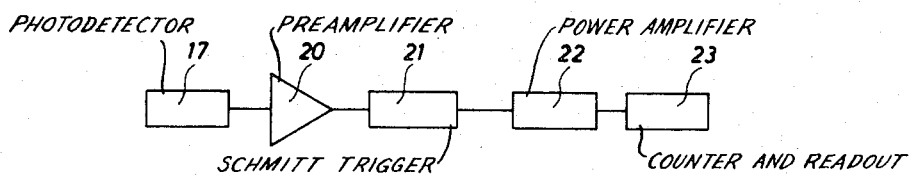
FIG. 6 shows the electronic circuit for one detector.

In FIG. 6 is shown the electronic circuit for one of the photoelectric detectors 17. The output of the detector 17 is connected to an input of a preamplifier 20, whose amplification factor is adjusted so that all the preamplifiers of the detectors deliver the same output signal when the corresponding optical fibres receive the same light intensity. The output of the preamplifier 20 is connected to an input of a Schmitt trigger 21 that delivers a logic 1 when the input of the trigger exceeds a certain threshold. This threshold is preferably $E_1 + E_2/2$, wherein $E_1$ is the output of the preamplifier when the corresponding optical fibre is not screened by the film 14 from the lamp 10, and $E_2$ is the output when the said fibre is screened by the film. The trigger 21 in its turn is connected to a power amplifier 22, feeding a counting and read out device 23.

The operation of the apparatus according to the FIGS. 1, 2, 3 and 6 is as follows. The film 14 moves at a constant rate of e.g., 50 cm/s between the infrared source 10 and the optical fibres 13. The light intensity in each fibre varies between the values $E_2$ and $E_1$ depending on the fact whether there is film material between the source 10 and the said extremity of the fibre or not.

When the output signal of a preamplifier 20 is e.g., greater than $E_1 + E_2/2$, a logic 1 signal is fed to the corresponding device 23. The device 23 is e.g., a digital computer, that counts the number of logic 1 signals due to the direct illumination of the extremities of e.g., the groups $X_1$ and $Y_1$. In fact, the number of illuminated fibres of the groups $X_1$ and $Y_1$ is a direct measure for the "C" dimension (see FIG. 4) of the perforation. If the film 14 deviates in a transverse direction in relation to the transport direction, over a distance smaller than half the length of the groups $X_1$ or $Y_1$, the sum of the illuminated fibres of the groups $X_1$ and $Y_1$ remains constant. So, the dimension "C" can be measured continuously with an accuracy of 10 $\mu$m. The repetition rate of the measurement depends on the transport rate of the film 14 and on the perforation pitch.

The specifications of the photoelectric detectors 17 can be determined as a function of the illumination tolerated on the margins of the film 14, the diameter of the optical fibres and the film transport rate. For a film transport rate of 50 cm/s, fibres of 10 $\mu$m diameter and standard 35 mm motion-picture film, the repetition rate of the measurement is 105 Hz and the frequency of measurement is 50 kHz.

Instead of using a digital computer, an optical matrix can be used to read out the value of "C."

In FIG. 5 is shown a light-producing counting and readout-device 23' in the form of a matrix by means of which it is possible to read out the value of "C" with an accuracy of 10 $\mu$m. If each of the groups $X_1$ and $Y_1$ has 10 fibres, the matrix must have 10 rows and 10 columns. The matrix 23 may be a diode-matrix, wherein light-emitting diodes are arranged at the nodes of the rows and columns, such as gallium phosphide and gallium arsenide phosphide diodes. Alternatively, the matrix may be an incandescent lamp matrix or a gas discharge lamp matrix.

The operation of the matrix 23' according to FIG. 5 is as follows. One terminal of the light elements of each of the rows one to 10 is connected to the output of the power amplifiers 22 of the corresponding optical fibres of the group $Y_1$, see the numbering in FIG. 3, whereas the other terminal of the light elements of each of the columns one to 10 is connected to the output of the power amplifiers 22 of the corresponding optical fibres in the group $X_1$. Thus, a light element in a node will light up when the corresponding row and the corresponding column is fed with a logic 1 signal, i.e., when the corresponding fibre in the group $X_1$ and in the group $Y_1$ are not covered by a portion of the film 14.

When the fibres 3 in the group $X_1$ and 6 in the group $Y_1$ are illuminated directly by the lamp 10, the fibres 1 and 2 in the group $X_1$ and 1 to 5 in the group $Y_1$ must necessarily be illuminated too. In the matrix 23' the lamps at the nodes indicated in FIG. 5 with a circlet will light up. The position of the corner of the illuminated rectangle marked in FIG. 5 with a black dot is a measure for the dimension C. For a constant value of C the corner moves along a straight line at 45°. Therefore it is possible to associate each line at 45° with a value of C. The arrangement can be such that the diagonal of the matrix 23' corresponds to the nominal value of C, what is indicated in FIG. 5 by the number 0 for the diagonal. The lines +1, +2, +3, +4, and −1, −2, −3, and −4 correspond to deviations of +10 $\mu$m, +20 $\mu$m, +30 $\mu$m, +40 $\mu$m and −10 $\mu$m, −20 $\mu$m, −30 $\mu$m, −40 $\mu$m, respectively, with respect to the nominal value of C. When the corner of the illuminated rectangle comes in the shadowed triangles, the deviation from the nominal value of C is greater than 40 $\mu$m.

Because of the high repetition rate of the measurement the lamps light up almost continuously so that the matrix can be read out visually because of the slowness of the eye. Alternatively, it is possible to arrange oblong formed photosensitive detectors along the lines at 45°, the detectors feeding logic circuits to determine the value of the dimension "C."

In the same way it is possible to measure the other dimensions shown in FIG. 4, independent of the transport rate and small deviations of the film 14 from its intended path. So the dimension D can e.g., be measured by means of the optical fibres of the groups W and V. The single fibre of the group W can be used to determine the measuring moment for the dimensions D and B.

Furthermore, use can be made of an enlarging optical system such as a projector 70 that projects an enlarged image of e.g., the left hand perforations on a screen 71 (see FIG. 7). On the screen 71 are arranged a number of photodetectors such as phototransistors in one or more groups each time arranged on a straight line, e.g., as shown in FIG. 2 for the optical fibres. In this way it is possible to obtain a greater separating power.

We claim:

1. Apparatus for gauging the distance between two parallel edges present in a moving web, comprising means for moving the web along a generally predetermined path, a radiant energy source directing radiation towards such path, two groups of radiation responsive detectors for receiving radiation after transmission or reflection by said web, each said group comprising a plurality of discrete detectors having their radiation responsive areas arranged in a row extending generally normal to one of said edges and adapted to be intersected by said edge on movement of the web and means for reading out the number of detectors in both groups which receive radiation after transmission through or reflection by said web to give an indication of said distance, said readout means comprising a matrix of light-producing elements arranged in intersecting rows and columns with one such element at each intersection, trigger means associated with each detector of said groups for selecting those detectors receiving a quantity of radiation varying from a given threshold value, the trigger means for the detectors in one group having the outputs thereof connected to one side of the terminals of said light-producing elements in the corresponding columns of said matrix, and the trigger means for the detectors in the other group having the outputs thereof connected to the other side of the terminals of said light-producing elements in the corresponding rows of said matrix.

2. Apparatus according to claim 1 wherein each said detector comprises a radiation-sensitive semiconductor element and an associated fiber optic, one extremity of said fiber optic terminating close to said radiation-sensitive element, the opposite extremity being arranged in a row with the corresponding extremities of the corresponding other fiber optics of the detectors in the same group.

3. Apparatus according to claim 1 wherein said trigger means is operative when the output of the corresponding detector rises above the value $E_1 + E_2/2$ wherein $E_1$ is the output of said detector if there is radiation transmitted through or reflected by the web, and $E_2$ of the output of said detector if there is radiation intercepted by said web.

4. Apparatus according to claim 1 wherein said light-producing elements are light-emitting diodes.

5. Apparatus according to claim 1 wherein said light-producing elements are gas discharge lamps.

* * * * *